United States Patent
Baron et al.

(10) Patent No.: US 8,032,353 B1
(45) Date of Patent: Oct. 4, 2011

(54) METHOD AND APPARATUS FOR PROVIDING PERIPHERAL CONNECTION MANAGEMENT IN A REMOTE COMPUTING ENVIRONMENT

(75) Inventors: Charles Peter Baron, Vancouver (CA); Noha Kafafi, North Vancouver (CA); Kevin Mlazgar, Vancouver (CA); Bradley Reginald Quinton, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 655 days.

(21) Appl. No.: 12/079,941

(22) Filed: Mar. 28, 2008

Related U.S. Application Data

(60) Provisional application No. 60/909,297, filed on Mar. 30, 2007.

(51) Int. Cl.
G06F 9/455 (2006.01)
(52) U.S. Cl. ......................................................... 703/24
(58) Field of Classification Search ................... 703/24, 703/25, 23; 710/8, 15
See application file for complete search history.

(56) References Cited

U.S. PATENT DOCUMENTS 5,430,863 A * 7/1995 Kmiec ............................. 703/24
2003/0191623 A1* 10/2003 Salmonsen ..................... 703/24

OTHER PUBLICATIONS

Abramson, Darren et al., "Intel® Virtualization Technology for Directed I/O," *Intel Technology Journal*, vol. 10, Issue 3, Aug. 2006, Copyright © 2006 Intel Corporation, pp. 179-192.

* cited by examiner

*Primary Examiner* — Paul Rodriguez
*Assistant Examiner* — Luke Osborne
(74) *Attorney, Agent, or Firm* — Moser Taboada

(57) ABSTRACT

A method and apparatus for utilizing a bridged peripheral system within a bridged computer system having a host computer and a remote computer. The host computer executes peripheral driver software that initiates at least one communication. The host computer also executes a peripheral emulation that represents a peripheral of the remote client computer, where the at least one communication is processed by the peripheral emulation. In one embodiment, the peripheral is an audio codec.

17 Claims, 7 Drawing Sheets

METHOD AND APPARATUS FOR PROVIDING PERIPHERAL CONNECTION MANAGEMENT IN A REMOTE COMPUTING ENVIRONMENT

CROSS-REFERENCE TO RELATED APPLICATIONS

This application claims benefit of U.S. provisional patent application Ser. No. 60/909,297 entitled "Remote Codec Communication Methods", filed Mar. 30, 2007, which is incorporated by reference in its entirety. This application contains subject matter that is related to the subject matter disclosed in U.S. patent application Ser. No. 11/534,600, filed Sep. 22, 2006, which is incorporated herein by reference in its entirety.

BACKGROUND OF THE INVENTION

1. Field of the Invention

Embodiments of the invention relate generally to remote computing. More specifically, embodiments of the invention provide a method and apparatus for establishing and maintaining communications across a network between peripheral drivers of a host computer and a remote computer connected to at least one peripheral device and/or emulating communications in the absence of a remote computer or peripheral device.

2. Background

Historic advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the user interface devices, including audio peripheral devices such as microphone, headphones, speakers, digital transceivers or other peripherals from the application processing parts of the computing system. In such a configuration, the user interface devices are physically located at the desktop, while the processing and storage components of the computer are placed in a central location remote from the desktop. The user interface devices are then connected to the processor and storage components by some method of communication such as a computer network.

Existing methods for supporting remote peripheral device, e.g., remote desktop application supporting remote monitors and audio codecs typically require custom drivers, and are prone to unreliable operation of the peripheral. Network latency and/or non-continuous data streams cause communications interruptions or even communications failure between a remotely located peripheral and a host computer, resulting in intermittent resetting or timeout of the peripheral and/or the peripheral driver. The resulting discontinuous operation is irritating to a user.

In the case of MICROSOFT WINDOWS environments, codecs are not readily discovered after an initial boot sequence which makes later connection of such devices problematic.

Therefore, there is a need in the art for an improved method and apparatus for providing peripheral connection management in a remote computing environment.

SUMMARY OF THE INVENTION

Embodiments of the invention include a method and apparatus for establishing, maintaining and emulating communications between host peripheral drivers and one or more remote peripherals.

A method and apparatus for utilizing a bridged peripheral system within a bridged computer system having a host computer and a remote computer is described. The host computer executes peripheral driver software that initiates at least one peripheral communications such as at least one command, query or controller communication. The host computer also executes a peripheral emulation that represents a peripheral of the remote client computer, where the peripheral communication is processed by the peripheral emulation. In one embodiment, the peripheral emulation responds to commands, provides a register interface and emulates interrupts, even if the remote client computer is not connected to the host computer. In one embodiment, the peripheral is an audio codec. In other embodiments, the peripheral is bus controller such as a bridged audio, USB or display controller or a child device such as a USB hub or peripheral device such as a mouse or keyboard connected to a USB controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
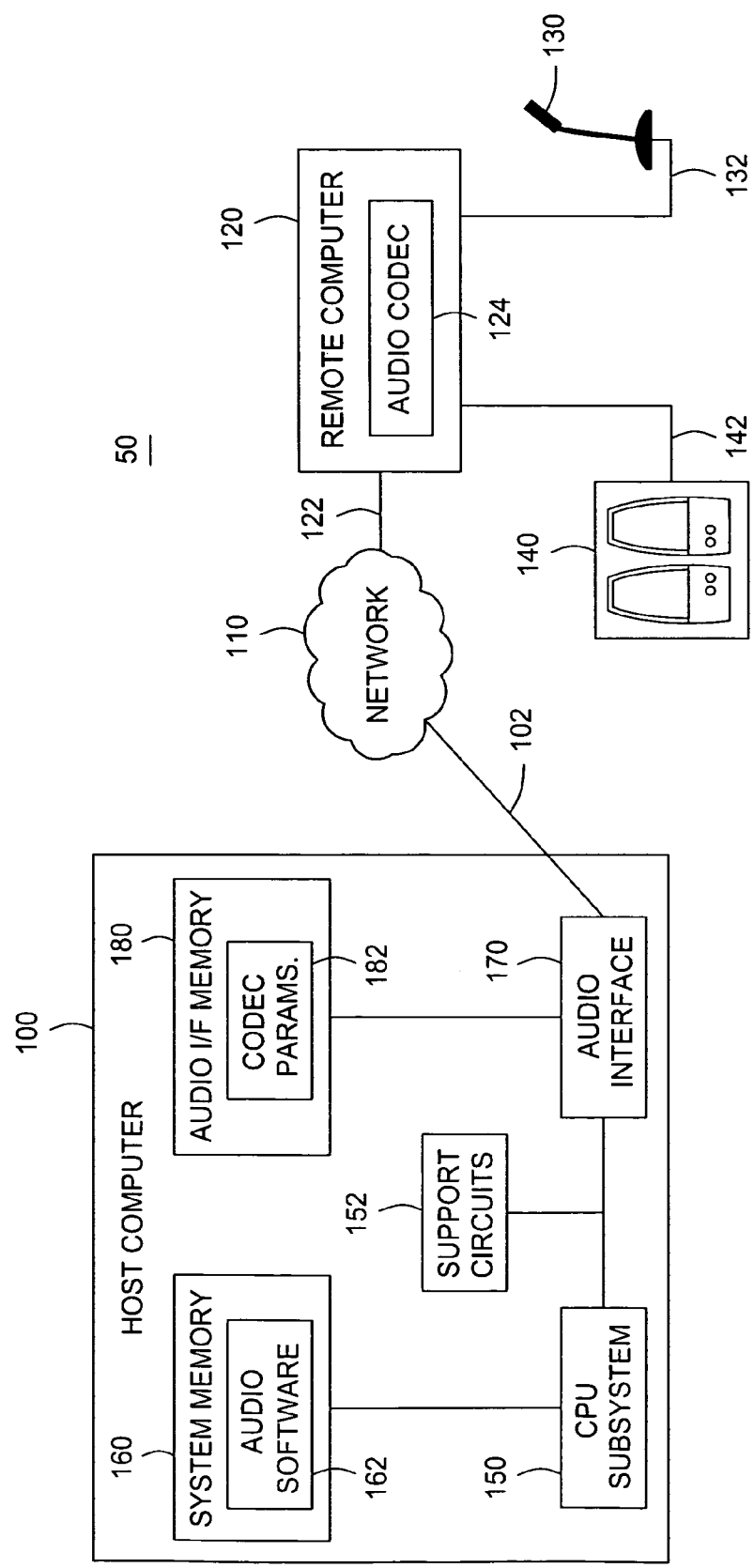
FIG. 1 depicts a remote computing environment comprising a host computer that is capable of being connected by a network to a remote computer with peripheral audio devices that operates in accordance with one embodiment of the invention.

FIG. 1 shows an embodiment of a remote computing environment 50 comprising host computer 100 capable of being connected by network 110 to a remote computer 120 with a peripheral, e.g., peripheral audio devices 130 and 140. In one embodiment of the invention, host computer 100 is a blade PC, a computer server or the like and provides audio services for remote computer 120. In other embodiments, host computer 100 delivers other services, such as other software applications or remote desktop services associated with remote computer 120.

In the embodiment of FIG. 1, host computer 100 comprises CPU sub-system 150 connected to system memory 160. CPU sub-system 150 provides the processing platform for audio software 162 and other software such as audio application software, operating system and the like. In an embodiment, CPU sub-system 150 comprises Central Processing Unit (CPU), north bridge, south bridge, Graphics Processing Unit (GPU), memory controllers, bus bridges and the like. Examples of a suitable CPU include 32-bit, 64-bit or other CPU such as OPTERON or ATHLON class microprocessors manufactured by Advanced Micro Devices; XEON, Pentium or X86 class processors manufactured by Intel; SPARC microprocessors manufactured by Sun Microsystems Inc. or microprocessor such as a PowerPC processor manufactured by Motorola. However, other suitable microprocessor platforms may be utilized.

Memory 160 comprises any one or combination of volatile computer readable media (e.g., Random Access Memory (RAM), such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, in some embodiments, memory 160 incorporates electronic, magnetic, optical, and/or other types of storage media.

In one embodiment of the invention, CPU-subsystem 150 is connected to audio interface 170 by a bus, such as a Peripheral Component Interconnect (PCI) bus, a PCI EXPRESS interconnect, a HYPERTRANSPORT interconnect, INFINIBAND interconnect or similar system bus. Audio interface 170 provides audio controller and emulation functions described below with respect to FIG. 3.

Figure 3:
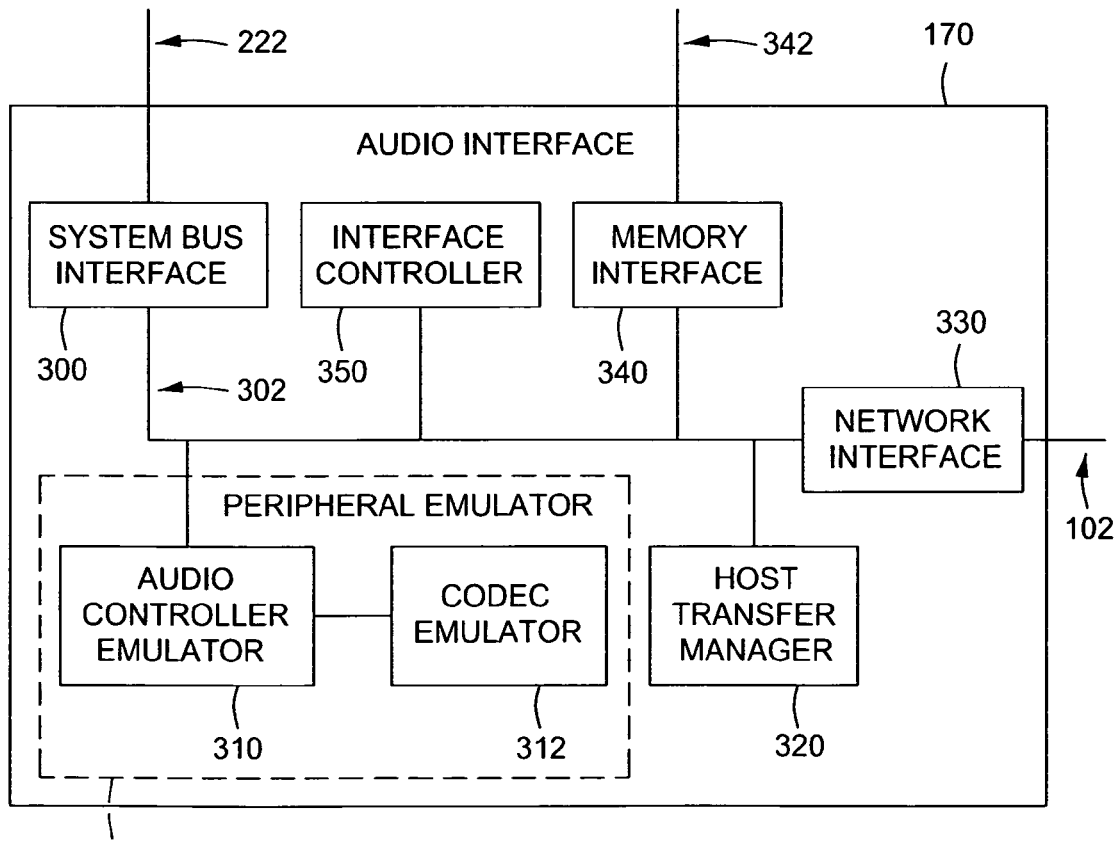
FIG. 3 is an illustration of an embodiment of an audio interface module that operates in accordance with one embodiment of the invention.

According to one or more embodiments, audio interface 170 is integrated in a component of sub-system 150, such as attached to the south bridge or implemented at least in part as computer-executable software in memory 180. Interface 170 presents to bus drivers in audio software 162 an industry-compatible audio interface comprising registers and signals associated with an audio bus controller. In an embodiment, interface 170 presents a register set and data structures such as an INTEL High Definition Audio (HDA) register set and data structures as specified in INTEL High Definition Audio specifications to software 162 and manages the communications of audio data and control information to/from remote computer 120. In an HDA embodiment, interface 170 exposes the High Definition (HD) Audio PCI class and sub-class value 0x0403, which enables enumeration of interface 170 as an audio controller function using a system bus enumerator such as Microsoft PCI enumerator. In an embodiment, audio interface 170 comprises a network interface for connection to network 110 and the transmission and reception of audio information to/from an audio codec 124 of the remote computer 120, for example, using suitable network interface controller technologies known to the art. In other embodiments, interface 170 uses network resources such as a standard Network Interface Card (NIC) and network services software associated with CPU sub-system 150. In such embodiments, network-related data is typically communicated across the system bus between the CPU sub-system and audio interface 170. While the embodiment of FIG. 1 illustrates a single audio interface 170, other embodiments comprises multiple audio interface modules connected to sub-system 150. Additional modules comprise independent network interfaces or share one or more common network interfaces. An embodiment of interface 170 is illustrated in FIG. 3 and described in the corresponding text herein.

Audio interface memory 180 comprises data structures including codec parameters 182 associated with interface 170 as well as packet buffers, such as latency or jitter buffers for inbound audio data (i.e., data sourced from remote computer 120 and terminated at host computer 100) and temporary storage structures for pre-assembled outbound audio packets (i.e., data sourced from host computer 120 and terminated at remote computer 120). In an embodiment, memory 180 also maintains a set of audio controller registers. In another embodiment, audio registers are incorporated in interface 170. Codec parameters 182 comprise a set of codec state variables under the management of a codec emulation function of interface 170, described below. According to embodiments of the present invention, codec state variables are datum that represent codec parameters that formally specify a codec functional group. In an INTEL HDA embodiment, they are conventionally accessed using verbs per the HDA specification. In an exemplary embodiment where interface 170 emulates behavior of a model number ALC883 audio codec from REALTEK corporation, codec parameters 182 comprise a set of codec state variables as exposed by the INTEL HDA SET and GET command interface. In an embodiment, a flag (herein referred to as a "different-from-default" flag) is maintained for each parameter that identifies whether the parameter is changed from its default setting. This feature enables efficient state management as described below with respect to FIG. 3 in conjunction with the description of codec emulation.

Support circuits 152 support the functionality of the CPU sub-system 150 and other functions of computer 100. In an embodiment, support circuits 152 comprise cache, local buses, interconnect chip set, power supplies, clock circuits, data registers, I/O interfaces, and the like.

Host computer 100 is connected to network 110 by network connection 102. In an embodiment, network 110 is a network such as an IP-based Local Area Network (LAN) used in a corporative environment or a Wide Area Network (WAN), as may be deployed between an application service provider such as an Internet Service provider (ISP) and residential application users.

Remote computer 120 is connected to network 110 by network connection 122. In one embodiment, connection 122 is an IP over Ethernet connection. Wireless, cable, digital subscriber line (DSL) or embodiments using other transport technologies are all suitable alternatives. According to various embodiments, remote computer 120 is a computer such as a personal computer (PC), thin client or other device suitable for hosting one or more audio codecs. Remote computer 120 includes but is not limited to audio bus 132 connection to microphone 130 and audio bus 142 connection to speaker set 140. In an embodiment, buses 132 and 142 are analog audio buses and speaker set 140 is a set of stereo speakers. Mono and multi-channel embodiments such as Dolby Digital 5.1 or 7.1 compatible buses are also contemplated. In other embodiments, bus 132 or bus 142 is a digital audio bus such as IEC-60958 compatible AES/BEU bus, AES3 bus, Sony/Philips Digital Interface Format (S/PDIF) bus, Integrated Interchip Sound (I$^2$S), or other wired or wireless bus suitable for communications of analog or digital audio signals. These audio signals are generated from network data and commands using a codec 124. In some embodiments, an audio controller in remote computer 120 interprets data and commands received from host computer 100. The audio controller presents audio data to the codec (e.g., via a 5-wire Intel HDA link interface) and codec 124 is unaware of the presence of network 110. The codec 124 may be a hardware or a software codec.

Microphone 130 and speaker set 140 are presented as examples of peripheral audio devices compatible with computer 120 and codec 124, and in no way limit the audio capabilities of the system. Examples of other audio devices suitable for connection to computer 120 include headphones, multi-channel speaker systems suitable for home theatre environments or multi-function products with integrated audio capabilities. Other embodiments have fewer or more audio devices and/or audio buses than illustrated in FIG. 1.

Figure 4:
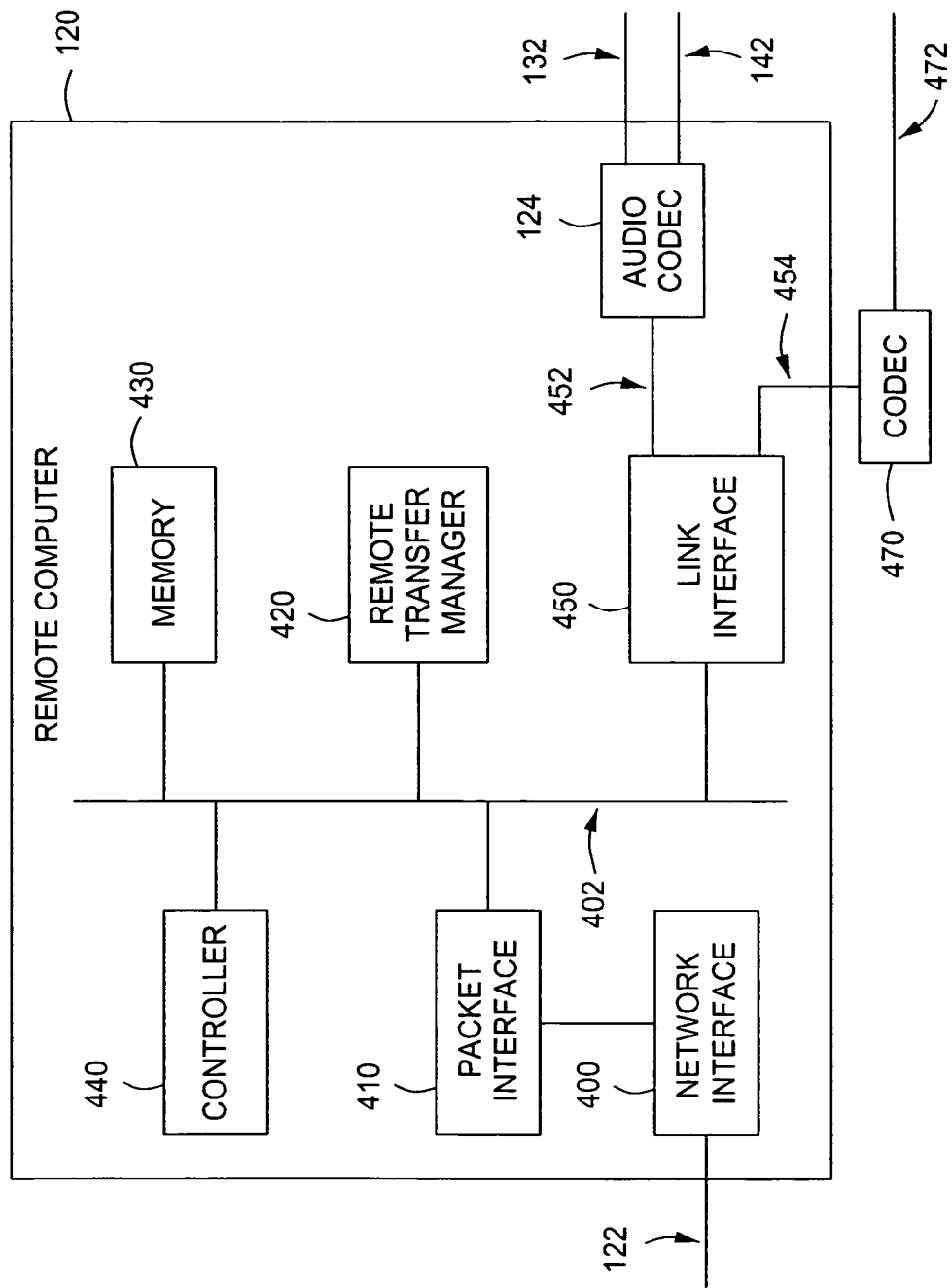
FIG. 4 is an illustration of a remote computer that enables the connection of peripheral audio devices to be operated in accordance with an embodiment of the present invention.

Remote computer 120 comprises codec functions and bus transceivers that provide physical termination of buses 132 and 142. In some embodiments, remote computer 120 provides other features such as display, mouse, keyboard or other components of a Graphic User Interface (GUI) not shown as not to obscure features of the present invention. An embodiment of remote computer 120 is illustrated in FIG. 4.

While the embodiment in FIG. 1 shows a single remote computer connected to network 110 and supported by host computer 100, alternative embodiments comprise multiple remote computers supported by host computer 100. In such an embodiment, a one-to-one correspondence or a one-to-many correspondence may be used with respect to the number of audio interfaces 170 used to support a plurality of remote computers 120. In other embodiments, no remote computer is connected at all and audio interface 170 emulates the presence of codec 124 or other codecs.

Figure 2:
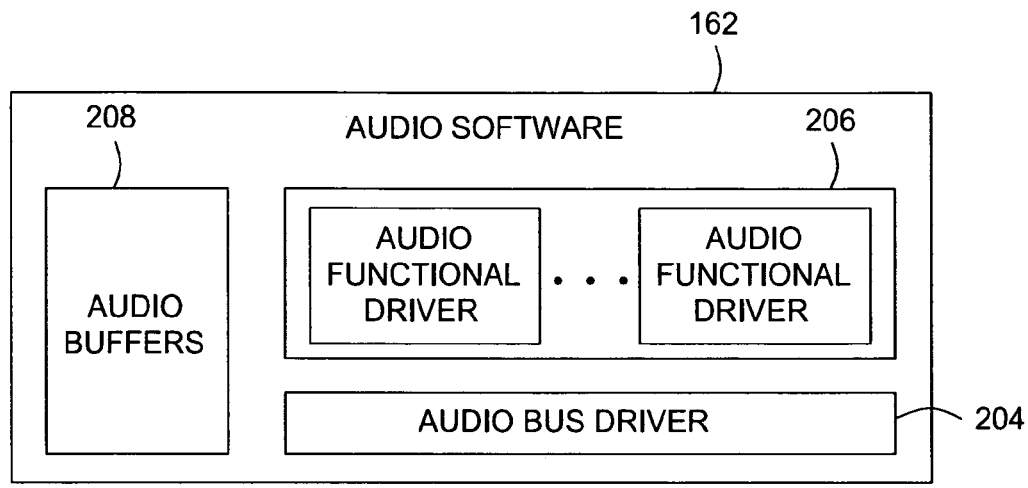
FIG. 2 is an illustration of audio software components stored in system memory.

FIG. 2 shows an embodiment of audio software 162 introduced in FIG. 1 comprising audio bus driver 204, audio functional drivers 206 and audio buffers 208. Audio bus driver 204 couple the hardware-based audio controller functions to the higher level audio functional drivers 206. In an embodiment, bus driver 204 is an industry compatible audio bus driver or bus driver stack such as an HD Audio driver compatible with the Microsoft Universal Audio Architecture (UAA) known to the art. In an embodiment comprising multiple audio controllers or audio interface modules, a separate audio bus driver is typically associated with each audio interface.

Audio functional drivers 206 comprise industry compatible audio functional drivers (alternatively termed audio "device" drivers or audio driver software according to some embodiments) which may be audio device specific or device agnostic. Given that some codec devices comprise more than one function group, some embodiments have multiple functional drivers. Drivers 206 support peripheral audio functional groups associated with functions of audio peripherals such as the peripheral devices connected to remote computer 120 in FIG. 1. In an exemplary embodiment, one functional driver is associated with each audio function related to codec 124 in remote computer 120 of FIG. 1. In an exemplary embodiment, functional drivers 206 comprise a microphone and speaker driver associated with microphone 130 and speaker set 140 in FIG. 1. Other embodiments comprise functional drivers associated with a modem function group or the like. In some embodiments, microphone, speaker and other audio functions are integrated in a single functional driver such as a SoundMAX Integrated Digital Audio driver from Analog Devices Incorporated. In other embodiments, at least some audio functional drivers are provided as installable software drivers from an audio device vendor. In other embodiments, drivers 206 are included with the operating system.

Audio buffers 208 comprise buffers such as one or more of input audio data buffer, output audio data buffer, command buffer and response buffer. In an exemplary HD Audio embodiment, buffers 208 comprise HD Audio compatible command output ring buffer (CORB), response input ring buffer (RIRB) and audio data buffers.

According to one or more embodiments of the invention, audio software 162 is supported by additional software modules in system memory 160 and executed by the CPU-subsystem. One such module is an operating system such as a WINDOWS operating system from Microsoft Corporation like WINDOWS XP or VISTA, a LINUX operating system available from many vendors or a UNIX operating system, also available from many vendors including Hewlett-Packard Inc. or Sun Microsystems, Inc. Another such module is application software further comprising one or more user application programs with audio functions. In an embodiment, application software comprises a media program that plays audio files such as Microsoft Media Player or ITUNES from Apple Corporation. In another embodiment, application software comprises an audio recorder program compatible capable of recording input audio from microphone 130 in FIG. 1. Other such software modules include other bus drivers, network protocols, device drivers, service modules and the like. According to some embodiments, audio software 162 is implemented in a virtual machine (VM) domain or in an I/O domain (such as "DOMAIN 0", "Dom" or IO Virtual Machine (IOVM)) under supervision of a Hypervisor such as ESX Server from VMWARE corporation, XEN from CITRIX Corporation or and the like.

FIG. 3 illustrates an embodiment of audio interface 170 in FIG. 1. The detailed structure of one example of a bridged audio controller is described in U.S. patent application Ser. No. 11/534,600, filed on Sep. 22, 2006, which is incorporated herein by reference herein in its entirety.

Interface 170 incorporates system bus interface 300 that couples functional blocks on local bus 302 to system bus 222 to CPU sub-system 150 in FIG. 1. In a PCI-Express embodiment, interface 300 incorporates north-facing PCI-Express termination circuitry and south-facing circuitry for the termination of local bus 302. In an embodiment, bus 302 comprises one or more data and control buses such as an AMBA bus connecting the elements of interface 170. The interface 170 comprises a peripheral emulator 314 coupled to the bus 302. In one embodiment, the peripheral emulator 314 comprises an audio controller emulator 310 and a codec emulator 314. In other embodiments, for example, related to FIG. 9 below, the peripheral emulator 314 performs various other emulation functions.

Audio controller emulator 310 comprises registers, interrupts and logic functions that enable interface 170 to present an audio bus controller interface on bus 222 to CPU subsystem 150 in FIG. 1. In an embodiment, emulator 310 provides HD Audio controller functions, including presenting an INTEL HDA compliant register interface and PCI DMA function to drivers in the CPU sub-system direction (e.g. by presenting an HD Audio interface function as a PCI audio controller to audio bus driver 204 in FIG. 2) while exchanging audio information including packets of audio data, commands and responses with remote computer 120 in the network direction, with the support of host transfer manager 320 and audio buffers 208 in FIG. 2. In an AC'97 audio interface embodiment, emulator 310 presents an AC'97 register and signal interface on bus 222. In some embodiments, some or all registers are located in memory 180 in FIG. 1. In some embodiments, emulator 310 itself has DMA controllers inherent to an HD Audio controller and is a fully functional audio controller that, along with emulator 312 provides the capability of emulating a remote codec regardless of whether a connection to the remote computer exists or not. In other embodiments, transfer manager 230 described below provides DMA functions inherent to an HD Audio controller. In some embodiments, audio controller emulator 310 implements cadence generators to provide audio timing signals such as 48 KHz or 44.1 KHz timing signals for timed framing of audio samples. In the outbound direction, emulator 310 also generates packets of samples suitable for network transmission, including appending audio specific header information such as stream ID, size, cadence, commands, responses, etc. in preparation for communication to the remote computer. In the inbound direction emulator 310 strips audio packets of zero padding, control information and audio responses from the remote computer before writing data across memory interface 340 along path 342 to memory 160 of FIG. 1. In some embodiments packet header append and strip functions are assigned to host transfer manager 320.

In an embodiment, codec emulator 312 supports the initialization of audio software 162 during system power up, even if there is no connection to remote computer 120 (FIG. 1), e.g., if computer 100 is powered before computer 120 or if both computers are powered but a media session has not yet been established. After connection establishment, emulator 312 initializes the far end codec and manages the communication of delay-sensitive and other codec communications between audio software 162 (FIG. 1), audio controller 310 and, conditionally one or more codecs 124 associated with remote computer 120, including maintaining the state of software 162 in the event of disconnection or reconnection of remote computer 120. According to one or more embodiments, emulator 312 also manages capabilities of a remote codec advertised to software 162. For example, the emulator 312 may manage with the objective of reducing audio traffic in a limited bandwidth environment. In an embodiment, fewer direct purpose modules, alternatively referred to as "widgets" in the INTEL HDA Specification are advertised which reduces the number of commands transmitted by software 162 to the remote codec. In other embodiments, restricted parameters such as a reduced maximum sampling rate, or reduced bit depth are advertised in order to manage or reduce the audio data rate. In another embodiment, a reduced number of operable audio channels is advertised in order to reduce the audio data rate. In an exemplary embodiment, a codec with 4 widgets is contemplated to support single stereo input and output audio paths (1 ADC widget, 1 DAC widget, and 2 Pin Complex widgets, wherein the aforementioned widgets are defined by the Intel High Definition Audio Specification v1.0, Apr. 15, 2004). In such an embodiment, emulator 312 is tasked with correctly configuring the physical remote codec, and properly translating the commands issued by the software 162 during power transition states discussed further in association with FIG. 5.

In some embodiments, a transcoding function presents a subset of the remote peripheral capabilities to software. For example an HD Audio codec (as present in the remote system) is presented as a 16-bit stereo codec to audio software in the host computer. In another embodiment, a non-default capability is presented to audio software. For example an exemplary audio codec supporting both Pulse Code Modulation (PCM) and Adaptive Differential PCM (ADPCM) capabilities is presented to audio software as supporting only a single compression mode (e.g. PCM) in order to preserve bandwidth. In another embodiment, an unsupported capability is advertised. For example, an exemplary codec emulator may advertise a specific audio compression capability (such as ADPCM) unsupported by the remote codec. In such an embodiment, the audio software performs the PCM compression and the remote computer decompresses the audio data prior to forwarding uncompressed audio data to the audio codec. Transcoding requirements and/or the capabilities of the remote codec or peripheral are pre-configured, obtained from the remote computer during session establishment or obtained from management infrastructure such as a connection broker during host initialization or session establishment.

Emulator 312 captures codec commands issued by audio software 162 (FIG. 1) destined for a codec 124 at remote computer 120. Emulator 312 then issues codec responses to software 162, ensuring a response sequence and timing such that software 162 remains in a deterministic state and such that software 162 continues to operate conventionally, independent of the state of the remote system. In an embodiment, emulator 312 maintains state synchronization with the remote codec by forwarding selective codec commands initiated by audio software 162 to the remote codec and receiving corresponding responses from the codec. Many commands are queries about the capabilities of the codec so emulator 312 responds with the correct value and the codec commands are never forwarded to the codec. In other embodiments, most responses from the codec are safely ignored and responses are gathered only in association with specialized polling commands inquiring about remote activities such as commands querying as to whether an audio jack has been plugged in, a query of the format of a S/PDIF-IN data stream or the like. In one or more HD Audio embodiments, emulator 312 terminates Audio Controller Reset (CRST) requests (generally referred to as CRSTB or CRST# in the INTEL HD Audio specification) from the software 162 and activates codec reset signals for the remote codec when necessary.

In some embodiments, emulator 312 implements one or more transcoding functions, for example compression of outbound audio data samples and/or decompression of inbound audio samples. In other transcoding embodiments, emulator 312 emulates a different codec or function to the actual codec or function implemented by the peripheral. In other embodiments transcoding is performed by emulator 310, a separate module of computer 100 or remote computer 120.

In some embodiments, one or more functional elements of audio interface 170 such as at least one of emulator 310, emulator 312, controller 350 and transfer manager 320 are executed at least in part as a software function associated with the Hypervisor of a virtualized environment. In an exemplary virtualized embodiment, audio interface 170 comprises multiple bridged audio controller functions, each function communicating with a remote computer in the network direction and a Hypervisor audio controller device model in the CPU direction. Each audio controller device model presents audio bus drivers in an associated virtual machine with a legacy INTEL HD audio controller interface using direct assignment, para-virtualization or emulation methods and implements codec emulation functions as described herein. Audio data such as commands and responses are communicated to/from the memory allocated to the virtual machine, for example using virtualized memory transactions via an IOMMU. In some virtualized embodiments, audio interface 170 provides network and PCI-Express bus inter-working functions and presents multiple PCI Express audio controller functions to the CPU sub-system. In other embodiments, audio interface 170 provides a network interface such that PCI Express bus inter-working and codec emulation is provided using driver software in the Hypervisor.

Once host computer 100 (FIG. 1) is operational, the current state of emulator 312 is retrieved from the codec parameters 182 in memory 180 (ref. FIG. 1) and communicated to the corresponding codec of remote computer 120. Audio data is streamed to remote computer 120 with the support of host transfer manager 320 as necessary, with emulator 312 deciding which commands should be communicated to remote computer 120. Specifically, the state variables with the different-from-default flag set are candidates for communication. If host computer 100 disconnects the session, emulator 312 continues to provide responses to audio software 162 as necessary. In the present specification, a session is the establishment of a bi-directional communication channel for media such as audio and optionally other media such as video and/or USB media between computers 100 and 120.

Host computer 100 may transition into a low power state at any time. In an embodiment, emulator 312 maintains a set of codec state variables as parameters 182 (ref. FIG. 1). Emulator 312 supports the search, fetch, modification and reset of these variables. A 'different-from-default' flag is maintained for each state variable which enable efficient communication of state changes to the remote computer. In an embodiment, the default state of the "Configuration Default" registers, (alternatively referred to as "Pin Configuration" registers per INTEL High Definition Audio specification v1.0 previously referenced) reflect the physical jack attributes at the remote computer which is different from the default values of the physical codec. In the case of a REALTEK model 883 codec, it should be noted that there are 3 state variables, namely 'Pin Sense', 'GPIO Data', and 'Digital Converter Control 1& Control 2', in which content is wholly or partially dictated by activity at the codec (i.e. jack detect status, GPIO input pins, and S/PDIF-input data formats). In an embodiment, these state variables are provided on a best effort basis if software 162 issues a GET command to retrieve these variables while disconnected from the remote computer.

In an embodiment, host transfer manager 320 provides Direct Memory Access (DMA) controllers and other processing resources that enable bridging of audio connections between audio controller emulator 310 and a remote computer. Transfer manager 320 executes address translation, timing management, interrupt and error handling functions. In an embodiment, transfer manager 320 is comprised of DMA controllers for the transfer of data to or from network interface 330, address translation tables, timing logic to enable rate control of audio streams and/or synchronized communications with the remote computer, control protocol functions and error handling logic. Remote-bound register updates written by software to audio controller emulator 310 are transmitted to a remote computer as separate control packets or compiled in headers of audio data packets. Inbound control information such as SDIWAKE, CRSTB loopback and SRST loopback values received from a remote computer is written to audio controller emulator 310 which results in updated audio registers, or conventional audio interrupts issued to the CPU sub-system using a substantially similar control interface to an industry-compatible audio bus controller. In some embodiments, transfer manager 320 includes audio data manipulation functions for compression, de-compression, silence suppression or the like.

Network interface 330 provides audio data and control packet encapsulation in addition to standard network controller and interface functions known to the art. In an embodiment, network interface 330 multiplexes audio frames, applies zero padding to ensure word alignment, inserts framing bits, and appends transport specific headers (e.g. IP and Ethernet) packet header information such as stream identity, payload size, timing information and audio command information to outbound packets on network link 102. Inbound packets on connection 102 are also stripped of IP and Ethernet headers before being passed to emulator 310 for further processing. Network Interface 330 also provides connection 102 to network 110 of FIG. 1. In some embodiments, network interface is 330 coupled with a system bus associated with CPU sub-system 150.

Memory interface 340 provides bus bridging functions between local bus 302 and memory bus 342 to audio interface memory 182 of FIG. 1.

Interface controller 350 provides management functions for audio interface 170 including initialization of functional components such as bus interface 300, emulators 310 and 312, transfer manager 320, memory interface 342, memory 180 (ref FIG. 1) and network interface 330. In an embodiment, controller 350 also establishes a management connection with remote computer 120 in FIG. 1 to enable communication of out-of-band status updates, error conditions or other information. In an Application Specific Integrated Circuit (ASIC) or Field Programmable Gate Array (FPGA) embodiment of interface 170, controller 350 is a suitable embedded processor such as a MIPS, ARM or other suitable embedded microprocessor known to the art. In a discrete embodiment of interface 170, controller 350 is any suitable microcontroller or microprocessor known to the art such as microcontroller or microprocessor products manufactured by AMD, Intel, Motorola or other manufacturers.

Various other embodiments of audio interface 170 are contemplated. In one variation, multiple transfer managers and interface emulators are implemented to support multiple remote computers. In another variation, memory 180 (FIG. 1) is distributed between functional blocks. In another embodiment, different types of audio emulators are present to enable concurrent use of different types of audio links.

FIG. 4 illustrates an embodiment of remote computer 120 that enables the connection of peripheral audio devices on buses 132 and 142. The detailed structure of one example of a remote computer comprising bridged audio controller functions is described in U.S. patent application Ser. No. 11/534, 600, previously referenced. In a remote computer embodiment such as a desktop appliance or thin client, remote computer 120 also comprises mechanical housing components, connectors, power supplies, indicators and other components not shown in FIG. 4 as not to unnecessarily obscure features of the present invention.

Remote computer 120 comprises network interface 400 that terminates network connection 122 and provides a network interface for audio information via packet interface 410 and local bus 402. In one embodiment, local bus 402 is a standard interconnect such as an AMBA bus suitable for an ASIC or FPGA implementation. In alternative embodiments, other suitable functional block interconnects or system buses are contemplated.

In some embodiments, packet interface 410 is a function located on bus 402 as depicted in the embodiment of FIG. 4. In other embodiments, packet interface functions such as described here are tightly integrated with the interface functions provided by link interface 450. In both cases, packet interface 410 provides audio data and control packet encapsulation functions. In an embodiment, packet interface 410 multiplexes host-bound audio frames comprising audio data and/or responses to configuration requests, applies zero padding to ensure word alignment, inserts framing bits, and appends packet header information comprising stream identity. payload size, timing information and audio response information to host bound audio data packets. Packet headers of peripheral bound packets from network interface 400 are also stripped of zero padding, control information and audio commands from the host computer before audio and/or codec control data is transmitted to codec 124 over audio link 452.

Remote transfer manager 420 operates in conjunction with host transfer manager 320 in FIG. 3 to provide bridged audio communications between remote computer 120 and host computer 100 in FIG. 1. Remote transfer manager 420 comprises DMA controllers for the transfer of data to or from packet interface 410, timing logic to enable synchronized communications with the host computer and error handling logic. In an alternative embodiment, remote transfer manager 420 incorporates compression, silence suppression or transcoding functions complementary to associated functions and interfaces of host computer 100 in FIG. 1. In a full duplex embodiment, both host and client perform compression and decompression and/or silence suppression and insertion functions.

In an embodiment, memory 430 comprises buffers for host or peripheral bound audio data. In the peripheral bound direction, jitter buffers temporarily store audio frames prior to transmission on links 452 or 454. In the host bound direction, packet assembly buffers store inbound frames until sufficient frames are available for a complete packet to be transmitted to the host computer. In some embodiments, memory 430 is distributed or integrated in one or more of the functional blocks shown. In one embodiment, packet buffers are maintained in packet interface 410 and frame buffers are maintained in link interface 450.

In an embodiment, system timing synchronization is achieved by controlling the fill level of audio buffers in memory 430, for example using high and low watermarks in conjunction with audio data rate control commands.

In an ASIC or FPGA embodiment of computer 120, controller 440 is a suitable embedded processor such as a MIPS, ARM or other suitable embedded microprocessor known to the art. In a discrete embodiment of computer 120, controller 440 is any suitable microcontroller or microprocessor known to the art such as microcontroller or microprocessor products manufactured by AMD, Intel, Motorola or other manufacturers. Controller 440 manages computer 120 including providing initialization of the local bus and functional blocks such as interfaces, memory, codec(s) and remote transfer manager 420. In an embodiment, controller 440 establishes a management connection with host computer 100 (ref. FIG. 1) for the exchange of out of band system control information.

Link interface 450 terminates audio link 452 and 454, including providing a physical interface, bus transceiver logic and transport layer protocol termination. In an embodiment interface 450 provides industry-compatible HD audio link termination using circuitry and logic functions known to the art. Interface 450 transmits output audio data and commands, receive input audio data and responses, communicates codec control information to codec 124 and 470, distributes a sample clock, executes a power mode state machine and provides bus reset and initialization functions. In some embodiments, registers associated with interface 450 maintain the configuration states of codec 124 and/or codec 470. These register values are emulated at the host computer (ref. codec parameters 182 in FIG. 1) so that audio software on the host computer has rapid access to codec state information during driver initialization or when computer 120 is disconnected.

According to an embodiment, interface 450 multiplexes codec commands and output audio stream data to form HD Audio compliant audio frames which are written to an outbound frame queue which is sufficiently sized to buffer two or three outbound frames in a peripheral bound direction towards codecs 124 and 470. Interface 450 serializes the frames and transmits them over link 452 or 454. In some HD Audio embodiments, interface 450 operates at a synchronous frequency of 48 MHz driven by a link timing signal derived from a local link timing clock. In an inbound direction, deserialized frames are stored in an inbound frame queue, assembled as packets in memory 430 and transferred to the host computer under control of a DMA processor associated with remote transfer manager 420.

In some embodiments in which emulator 312 in FIG. 3 implements one or more transcoding functions such as compression and/or decompression, link interface 450 may be tasked with performing the reciprocal function. In other embodiments link interface performs transcoding of inbound coded data to a different format expected by audio interface 170 in FIG. 1.

In some embodiments, link interface 450 supports multiple codecs connected to audio link 452. For example, in an exemplary case supporting a pluggable audio link, external docked codec 470 connects to pluggable audio link 454 Link interface 450 detects the connection of a docked codec and signals to the controller that a new codec is present, which can for example assert a dedicated reset signal (e.g. HD Audio CRSTB or CRST#) such as in the case of an INTEL ICH6, ICH7 or ICH8 I/O controller embodiment. In another embodiment, dockable codec 470 with audio link 472 shares audio link 452 and a common reset signal. In such an embodiment, both codecs are reset as a result of initializing recently connected codec 470.

In an embodiment, codec 124 is an industry compatible codec known to the art. In one embodiment, codec 124 is a High Definition Audio codec such as a model ALC88x from REALTEK corporation or a VINYL VT codec from VIA Technologies. In another embodiment, remote computer 120 comprises a digital media transceiver function such as a High Definition Multimedia Interface (HDMI) and link 452 communicates with an HDMI transmitter such as a Silicon Image SiL1x HDMI Transmitter. Other embodiments comprising discrete codecs or functional blocks suitable for ASIC integration are also contemplated.

Various embodiments of remote computer 120 are contemplated. In one variation, remote computer 120 is a standard computer such as a desktop or laptop computer modified to support bridged audio connections. In such an embodiment, network interface 400 is a standard PC network interface, controller 440 is a standard PC processor such as an Intel Pentium processor and local bus 402 is a standard I/O expansion bus such as a PCI bus. Remote transfer manager 420, link interface 450 and codec 124 are then integrated on one or more PC expansion cards or modules. Alternative embodiments use different suitable desktop or thin client processors such as those manufactured by Intel, Sun Microsystems, Motorola, AMD or VIA Technologies Inc. In another embodiment, remote computer 120 is an ASIC or FPGA integrated in an appliance such as a phone or a computer monitor.

Figure 5:
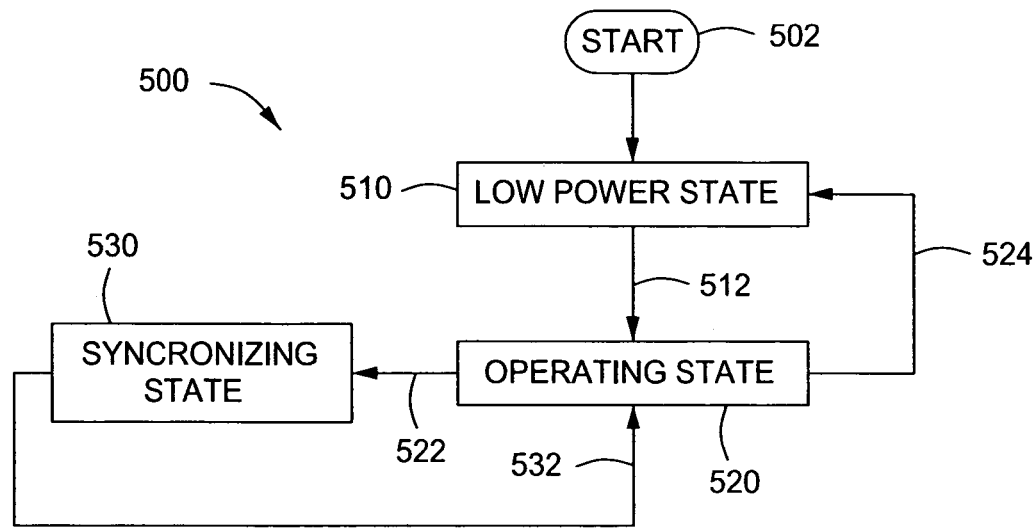
FIG. 5 is an embodiment of a state transition diagram for a codec emulation function operating in accordance with an embodiment of the present invention.

FIG. 5 is a flow diagram showing an exemplary state transition embodiment associated with power modes of host computer 100 and audio interface 170. As will be appreciated by those of ordinary skill in the art, embodiments of audio interface 170 implement some or all of the conventional power modes associated with an audio controller coupled to a CPU sub-system by a system bus and therefore, numerous variations on the embodiment of FIG. 5 are contemplated. If a connection to remote computer 120 exists, CPU sub-system 150 or audio interface 170 takes the appropriate action to ensure the remote computer and codec are also in the appropriate low power mode, for example by issuing suitable commands. If no connection exists, the remote computer autonomously ensures that appropriate low power modes are implemented. Once a connection is re-established host computer 100 communicates its power state to the remote computer. In some embodiments, the power state is maintained in the host computer (for example as codec state information in codec parameters 182) and is sent to the remote computer and codec when a connection is established. In some remote embodiments, if no connection exists, the codec is automatically put into reset, for example by remote controller 440.

State transition method 500 of FIG. 5 is an embodiment of a state transition method for a codec emulator such as emulator 312 in FIG. 3. The CPU sub-system of embodiment 500 is enabled to transition between several industry compliant power modes including various reduced power modes and a working power mode.

Method 500 starts at 502 and proceeds to Low Power State 510. In state 510, the CPU sub-system is in a low power state such as the G1—Sleeping (S1-S4), G2—Soft Off, or G3—Mechanical off as designated by the Advanced Configuration and Power Interface (ACPI) specification for global power states. In state 510, the audio software (ref. software 162 in FIG. 1) is non-operational and the audio interface (ref. interface 170 in FIG. 1) is in an undefined state. Audio controller and codec emulators perform no activity until it is given sufficient resources to determine if the CPU sub-system has resumed to a state such as G0—Working power per ACPI definitions. In an ACPI-compliant embodiment, the audio software provides a rising edge on the CRST bit of a conventional INTEL HDA controller register space which resets the codec emulation and audio controller emulators of audio interface 170. The remote codec is reset if attached.

In transition 512, the CPU sub-system has achieved working power such as G0—Working power and the audio interface enters an operating state 520. On initial entry to state 520 the audio driver has no communication with any remote codec at the remote computer (ref codec 124 in FIG. 4). The audio controller emulator and codec emulator together maintain an HD Audio register interface and provide the response functions that maintain a defined state for the audio drivers. For example, this is accomplished by supporting driver loading, responding to changes in the CRST bit by reflecting CRST sticky bit status and resetting codec parameters (ref. parameters 182 in FIG. 1), responding to GET commands by fetching relevant parameters and constructing corresponding codec responses including mimicking response sequences that give the audio software the impression that the audio software is streaming data after initialization if required. If audio software requests outbound data, descriptors are fetched and subsequently discarded to emulate successful streaming. If audio software requests inbound data, no action is required.

In the case of a connection event (state transition 522), the system transitions to synchronizing state 530. In an embodiment, full duplex communications is enabled with the remote audio codec. State 530 synchronizes the state of a newly attached remote codec with the current state of the codec state variables in parameters 182 (i.e., bringing the remote codec to a state expected by the audio software by communicating state variables with a different-from-default flag set). In an embodiment, the codec is reset before any synchronization commands are communicated. In another embodiment, commands issued by the audio software continue to be queued by the audio controller emulator during synchronization so as not to induce CORB backpressure. The amount of time that the audio interface remains in state 530 is determined by the number of codec state variables different from their default states. In an embodiment, the audio interface transitions back to Low Power State 510 if the CPU sub-system enters a low power state (e.g. G1, G2, or G3) during state 530. Once the system is synchronized (state transition 532), it returns to operating state 520 where the codec emulator continues to respond immediately to selective GET commands issued by audio software by returning the codec state variables in parameters 182 and passing CRST events and streaming data to the remote codec without additional processing and relays relevant SET commands to the newly attached codec.

The audio interface transitions out of operating state 520 to Low Power State 510 if the CPU sub-system transitions to an ACPI-compliant low power state such as G1, G2, or G3 Global Power states.

Figure 6:
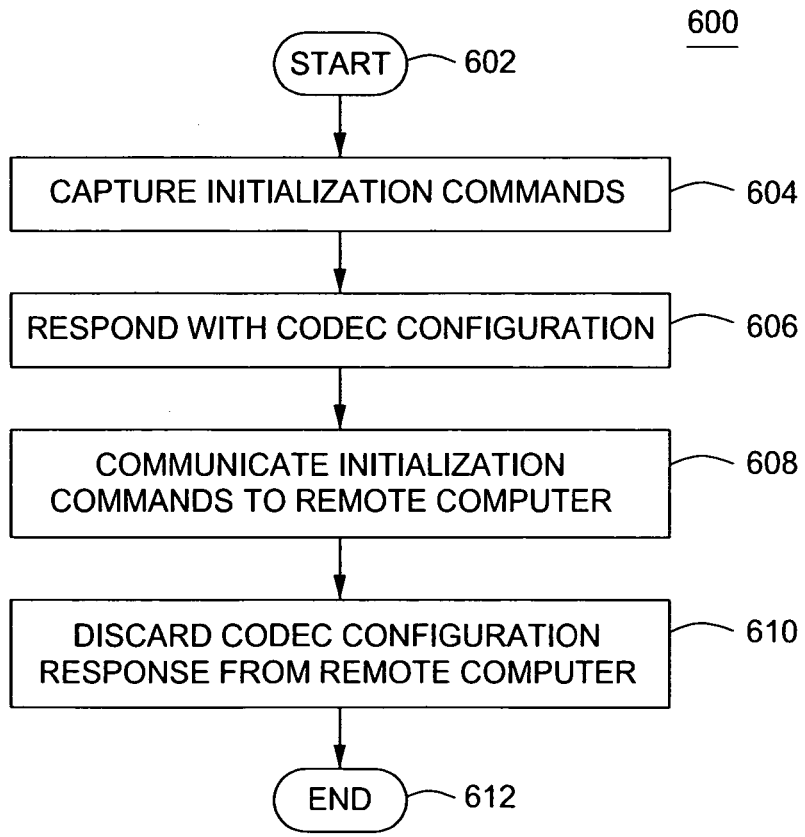
FIG. 6 depicts a flow diagram of a method of initializing audio software in accordance with an embodiment of the present invention.

FIG. 6 depicts a flow diagram of a method 600 of operation of the audio interface during initialization of the audio software. However, according to various embodiments, there is no substantive difference between operation during initialization and normal subsequent operation. The audio interface behaves as if it is directly connected to a codec and stores the codec state. If a connection exists, changes in codec state are sent to the codec at the remote computer. Upon establishment of a connection, the complete codec state is sent to the codec at the remote computer. In a typical computer, when audio software is initially launched, the software determines a codec's configuration and the software operation is adapted to conform to the nature of the codec. This initialization process comprises communication between the processor executing the audio software and the codec. In a remote computing environment, communication between the host processor and the codec of the remote computer may comprise delays that are unacceptable to the audio software. One embodiment of the invention comprises the use of the audio emulator 312 and its associated audio controller emulator 310 in FIG. 3 to facilitate initialization of the audio software.

The method 600 is instantiated upon the initialization of the audio software. The method 600 begins at step 602 and proceeds to step 604. At step 604, the method 600, by monitoring the CORB in system memory, captures initialization operations such as the initialization command sequence intended for a codec. At step 606, the audio controller emulator 310 and the codec emulator 312 respond to the commands with a codec configuration. The commands utilize "GET" and "SET" commands that gather (get) codec information for the software and establish (set) certain information (states) within the codec. The emulator provides the codec information to the software and stores the states, for example as codec parameters 182 in FIG. 1. The emulator may also store some or all of the commands, for example to ensure ordering. In this manner, the emulator may be defined to emulate any form of codec. Alternatively, according to some embodiments, only the effects associated with the commands (such as actual state changes) are stored.

At step 608, entered when a remote computer is attached, the remote codec is reset by spoofing a CRST event which results in the assertion of the reset pin to the remote codec. The audio interface copies some or all of the stored state variables to the remote computer by issuing suitable commands. In one embodiment, the emulator uses a first in, first out (FIFO) memory to store commands and couple them to the codec of the remote computer. In other embodiments where command order is important, the emulator passes all SET commands to the remote codec without intervention and only intervenes with responses to GET commands. At step 610, whatever response received from the codec as a result of a command is discarded rather than being forwarded to audio software (although the response data may be used by the codec emulator to update state information prior to deletion). According to some embodiments, step 608 and 610 are performed together such that all responses are discarded when the synchronization commands are issued. The method 600 ends at step 612.

Figure 7:
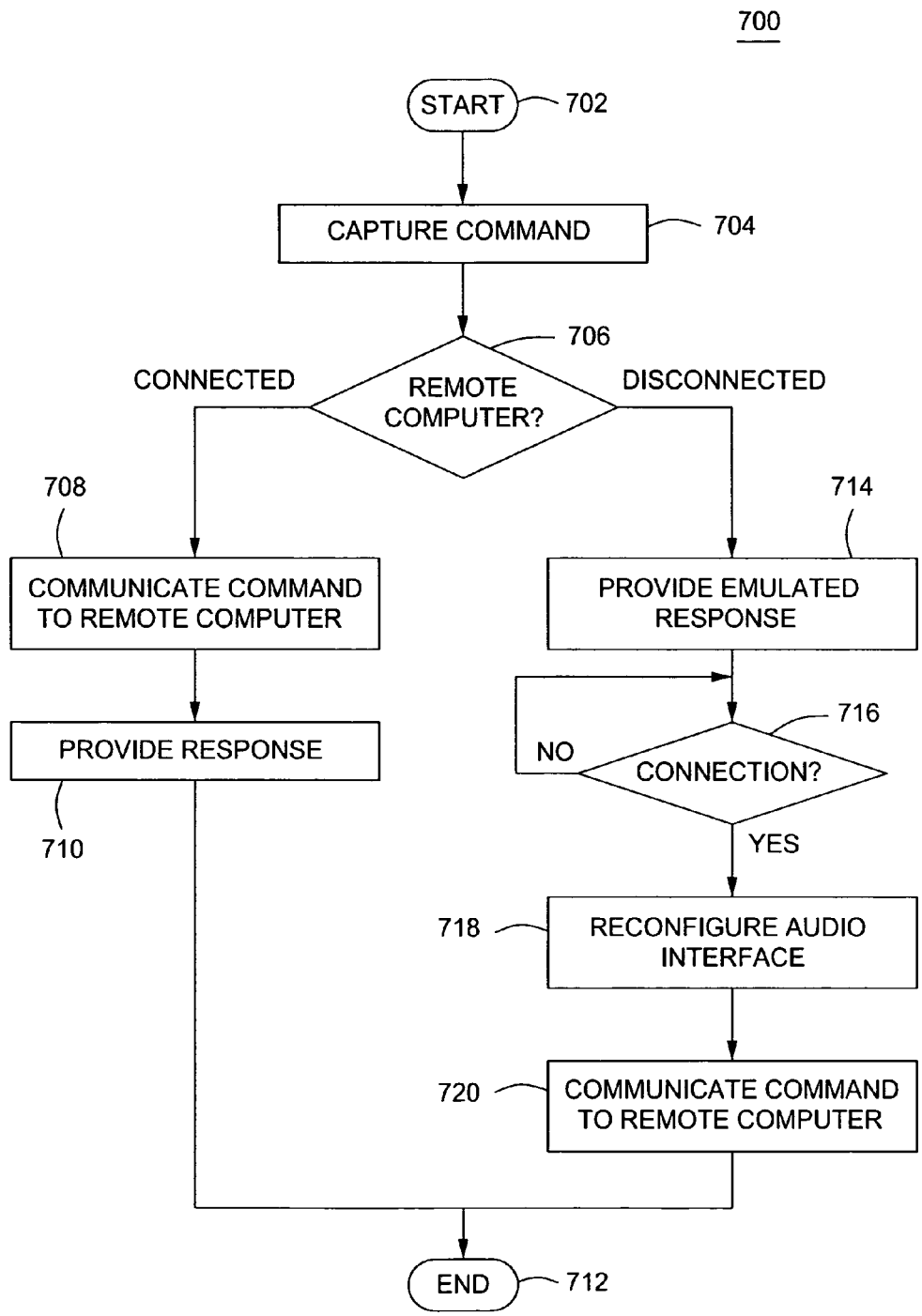
FIG. 7 depicts a flow diagram of a method of maintaining an audio connection in accordance with an embodiment of the present invention.

FIG. 7 depicts a flow diagram of a method 700 for processing audio commands as they are captured by the emulator after initialization is complete. The method begins at step 702 and proceeds to step 704 wherein the emulator captures the audio commands from the CORB. At step 706, the method 700 queries whether the remote computer is connected or disconnected.

If connected, the method 700 proceeds to step 708 where the command is communicated to the remote computer. In one embodiment, only SET commands may be copied to the codec. In other embodiments, all commands, after initialization, are sent to the codec. At step 710, a response is provided to the audio software. In some embodiments, the codec emulator returns the response associated with the appropriate state variable immediately and the response from the remote computer is discarded. However, in some ALC883 embodiments, responses to commands such as 'Pin Sense', 'GPIO Data', 'Digital Converter Control 1 and 2' are returned to the audio software. This ensures that volatile information associated with these registers affected by activity at the remote computer are communicated to the audio software. The method 700 ends at step 712.

If the remote computer is not connected, the query of step 706 causes the method to proceed to step 714, where an emulated response to the captured command is generated and provided to the audio software. At step 716, the method 700 queries whether a connection exists to the remote computer. In the absence of a connection, the response to GET or SET commands is issued from the codec state variable table of the emulator. Further, the state variable in the table is modified if it is a SET command in the case that order is not important. If order is important, the SET commands are queued for later transmission.

When a connection is established (at step 716), the method proceeds to step 718 where the codec is reset, and either the state variables that are different from default are used to update the codec (for example in the case on a non-ordered command environment) or the SET command queue is used to update the codec (for example, in the case on an ordered command environment). As a next step 720, commands are communicated and associated responses are discarded. In a typical HD Audio embodiment, a response is received for every command issued. In some embodiments, the emulation continues to respond to the driver from its internal state variables rather than wait if there is an interruption in communications as to prevent a driver error incurred by waiting.

The method 700 ends at step 712 to await the next command. In this manner, when a remote codec is disconnected (e.g., an interruption in communications), the audio software continues to operate normally and interfaces with the audio emulation until the remote computer is available. Thereafter, a seamless transition to communication with the codec is achieved i.e., the host does not attempt to reset the codec in response to the communication interruption.

Figure 8:
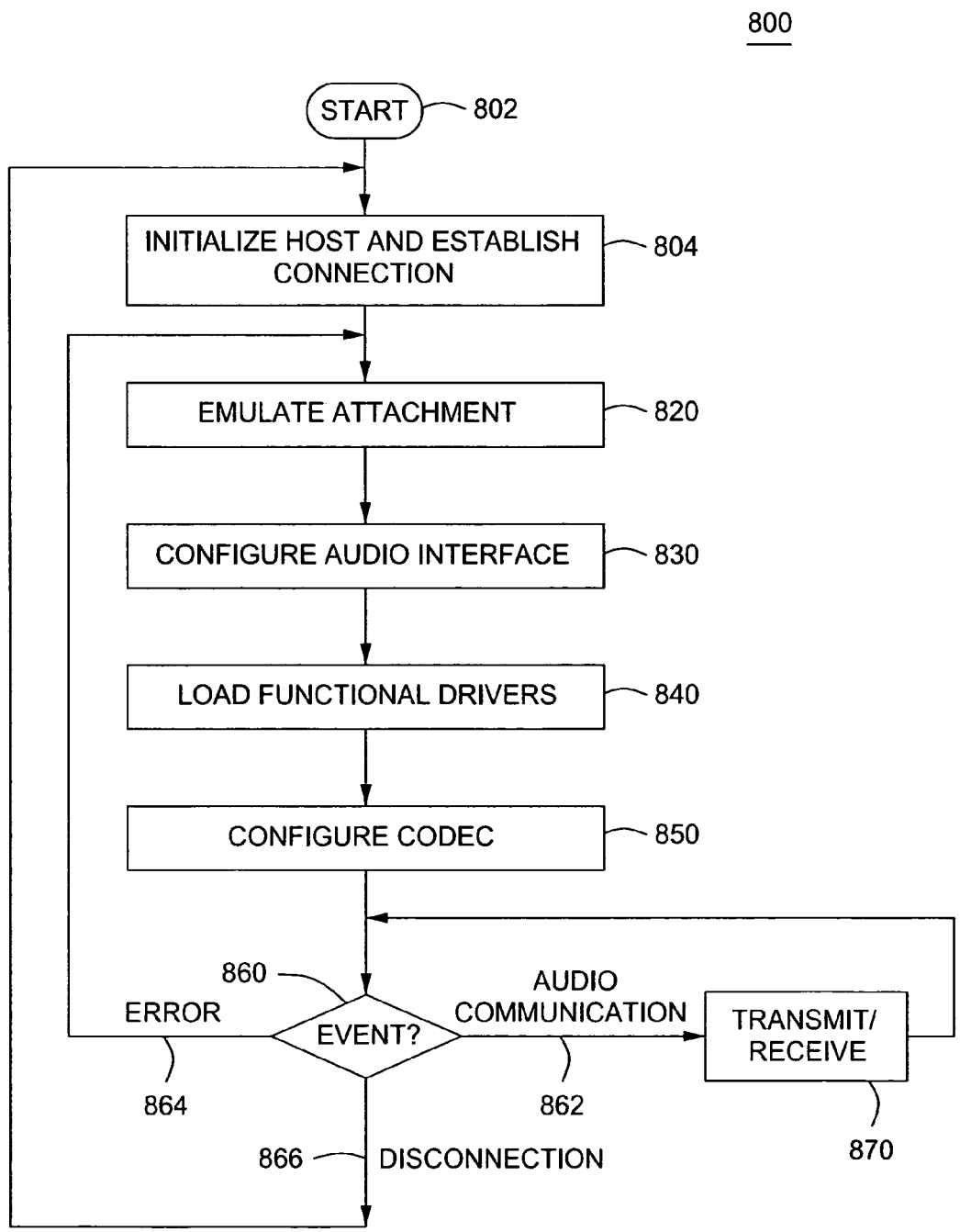
FIG. 8 depicts a flow diagram of a method for establishing and maintaining an audio connection in a bridged computing environment in accordance with one embodiment of the invention.

FIG. 8 is a flowchart that depicts an embodiment of a method 800 for establishing and maintaining an audio connection between a host computer and one or more remote codec devices using a bridged bus controller system, including recovering from an error such as an interrupted connection. In an embodiment, the bridged bus controller system defined herein comprises an audio interface such as interface 170 in FIG. 1 at the host computer communicatively coupled by a network to a remote computer such as computer 120 in FIG. 1 comprising a remote transfer manager and link interface coupled to the remote codec(s).

The method 800 begins at step 802 and proceeds to step 804, where the host computer is initialized after power is applied or following a system reset. In an embodiment, the CPU sub-system is initialized and software such as operating system loaded. Once the host has been initialized, a connection between the audio interface and the remote computer (ref. computer 120 in FIG. 1) is established. In some embodiments, a connection broker is used to manage connection establishment, including constraining capabilities of the audio system, for example as required by a system administration function. The remote computer may be powered before or after the host computer but a connection is only established after both computers have been powered and network interface initialized. Once a connection has been established, the audio interface is provided (e.g., using out-of-band signaling) physical audio jack-specific knowledge such as jack type, position, color and the like (for example as described by the INTEL HDA default configuration register) from the remote computer for use during subsequent codec configuration.

At step 820, an attachment is emulated so that the audio interface can be initialized using current remote configuration information such as the default configuration information provided in step 800. As an example of a PCI-Express embodiment, step 820 comprises emulating a hot plug event by issuing a sequence of commands which force the PCI-Express bus interface of the audio interface in and out of a high impedance state and toggling a PMEI reset interface. In such an embodiment, the PCI hot plug driver recognizes the hot plug event and re-initializes the associated bus segment.

At step 830, the audio interface, comprising bus drivers and audio interface module are configured. In an embodiment, the attachment event of step 820 results in the enumeration of devices on the PCI bus segment. The audio interface is enumerated as an audio bus controller, for example by responding to requests from the PCI enumerator with the appropriate audio class information. In a Microsoft WINDOWS HD Audio embodiment, the audio interface exposes the High Definition Audio PCI class and subclass ID value, 0x0403, to the Microsoft PCI enumerator. Once the audio interface is enumerated as an audio bus controller, an audio bus driver such as the Microsoft WINDOWS HD Audio bus driver is loaded. The bus driver queries the codec emulator for hardware identification information, for example using the CORB/RIRB interface. The codec emulator supplies the bus driver with information such as vendor ID and device ID. SET commands are queued or sent to the remote system using the audio bridge previously described Once the codec emulator responds with the vendor ID information, the audio functional driver(s) corresponding with the remote codec capabilities are loaded at step 840 ("Load functional drivers").

At next step 850, the codec emulator is parsed by the audio functional driver and the remote codec configured as determined by the pre-defined default configuration. e.g. SET commands are sent if state variables have a different-from-default flag set, indicating a difference with what is stored remotely. The attributes of the physical audio jacks of the remote computer are relayed to the audio interface and the state variables updated. In an embodiment, the audio interface returns early emulated responses to SET and GET commands issued during configuration with the responses being the same as the delayed responses expected from the remote computer. This prevents a host driver timeout condition resultant from the round trip response latency induced by the network. In another embodiment, the host audio interface constrains the capability of the audio system by intercepting responses from the codec, changing the attributes of the codec and forwarding the edited responses to the host drivers. In some embodiments, it is more convenient to always provide the altered response immediately and edit the SET commands from the host computer to the remote computer in order to advertise a reduced functionality. In such embodiments, the commands issued by the driver presume the reduced functionality.

At step 860, the host audio interface responds to audio events from host audio drivers or the remote computer.

In path 862, an audio communications event occurs and audio information is communicated at step 870. In one case, an audio command is issued by the audio driver and forwarded to the remote computer. In another case, an audio response is received from the remote computer and forwarded to the audio driver. In other cases, audio data is communicated between the host and remote computers.

In path 864, an error such as an unrecoverable communications error is detected. One example of such an error is the reception of corrupt interface control information outside the corrective domain of the audio bus drivers or host audio controller module. Audio communications is re-established by re-executing attachment method 820 and reinitializing the audio driver stack, or in the event of a severe error such as the loss of the host-client session, re-establishing a connection as step 804.

In path 866, a disconnection event such as a user log-off event is detected and the system returns to re-establishing a host connection, for example when a new session is initiated.

The foregoing embodiments of the invention focused upon the use of an audio interface to facilitate use of a remotely located audio codec within a remote computing environment. The general concept of using such an interface to locally emulate the audio codec within the host computer can be extended to encompass other forms of peripherals, e.g., monitors, input devices and the like. In an exemplary computer monitor embodiment, an interface that emulates the Display Data Channel (DDC) is contemplated, for example by mimicking responses to requests for extended display identification data (EDID) or other display capabilities information.

Figure 9:
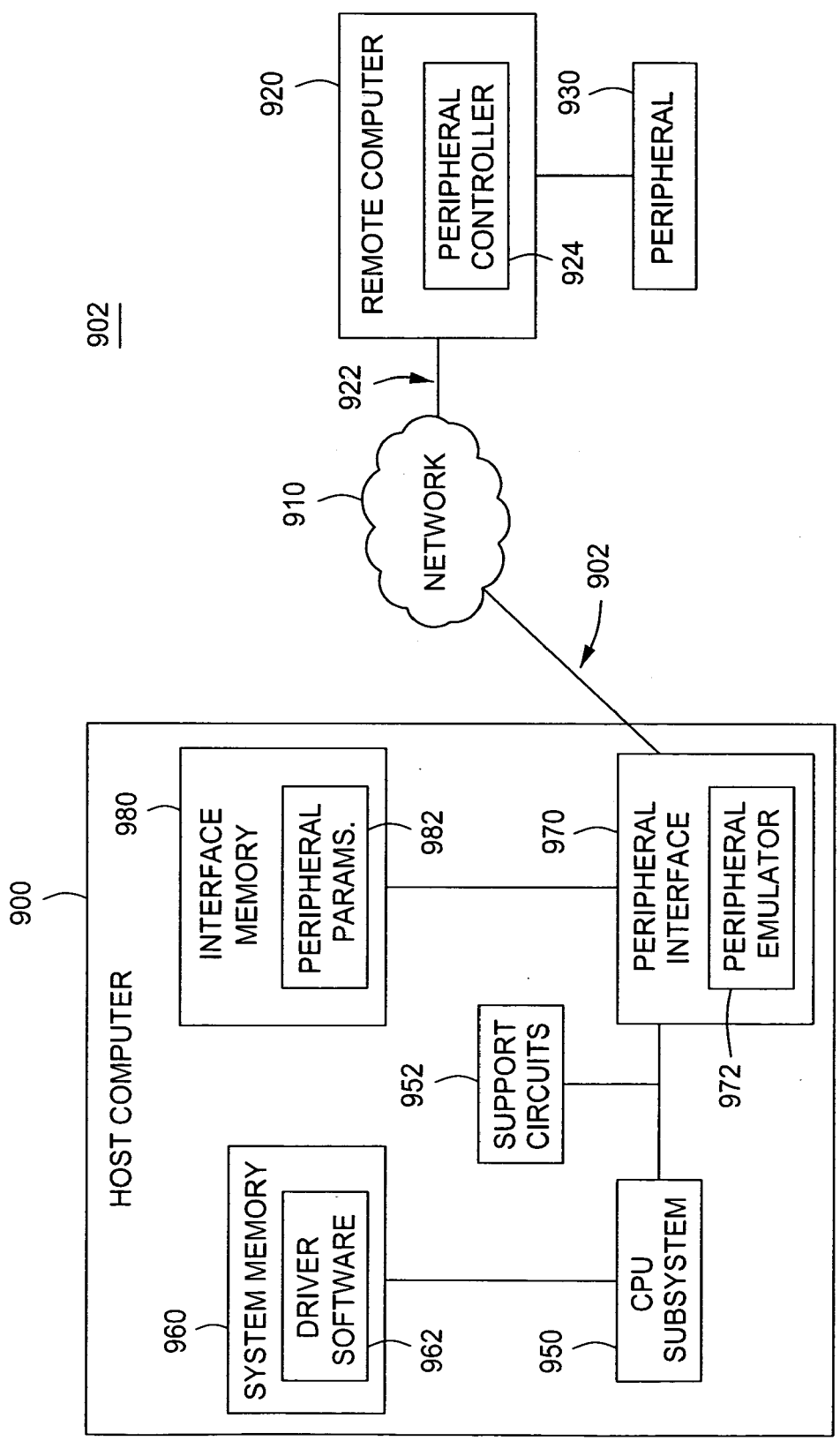
FIG. 9 depicts a block diagram of a remote computing environment comprising a host computer connected by a network to a remote computer with a peripheral device that operates in accordance with an embodiment of the present invention.

FIG. 9 depicts a remote computing environment 902 comprising a host computer 900 coupled through a network 910 to a remote computer 920 that is coupled to a peripheral 930. According to various embodiments, peripheral 930 comprises at least one of a docking station, a USB controller, a PCI peripheral or comparable standardized communications interface. The host computer 900 comprises a CPU subsystem 950, system memory 960, interface memory 980, support circuits 952 and a peripheral interface 970. The CPU subsystem 950 interacts with the support circuits 952, system memory 960 and peripheral interface 970 in substantially the same manner as described with respect to FIG. 1 above. The CPU subsystem 950 executes peripheral driver software 962 that expects to interact with a locally connected peripheral. The embodiment of the invention provides the peripheral interface 970 that interacts with the driver using locally stored and/or generated peripheral parameters 982 independent of the status of the connection to remove computer 920. The driver software 962 operates as if the peripheral 930 was locally connected.

The peripheral interface 970 comprises a peripheral emulator 972 that interacts with the driver software 962 to emulate the interface of the peripheral 930. The peripheral interface 970 interacts through the network with a peripheral controller 924 within the remote computer 920. The peripheral controller 924 may comprise a remote driver or other software and/or hardware that couples to the peripheral 930. In this manner, the driver software 962 interacts with the peripheral interface 970 and is buffered from any network latency and/or communications interruptions. As such, operation of the host computer is not impacted by the latency and/or interruptions such that recovery from latency and/or interruptions is seamless.

While the foregoing is directed to embodiments of the present invention, other and further embodiments of the invention may be devised without departing from the basic scope thereof, and the scope thereof is determined by the claims that follow.

The invention claimed is:

1. A method of managing communications bridged, via a communications network, between a host computer and a peripheral of a remote computer, the method comprising:

executing, within the host computer, a device driver for the peripheral to produce a communication for the peripheral that requires a response within a time limit, wherein the time limit is less than a response latency between the host computer and the remote computer via the communications network; and executing, within the host computer, an emulation of the peripheral to generate the response such that the response is received by the device driver within the time limit, wherein (i) the peripheral is an audio codec, (ii) the device driver is an industry standard audio driver included with an industry standard operating system, (iii) executing the emulation comprises presenting, via an audio bus driver, an audio controller interface to the industry standard audio driver, (iv) the emulation is an audio codec emulation, (v) executing the emulation further comprises producing configuration data for the industry standard audio driver, the configuration data based on an available bandwidth of the communications network, (vi) executing the industry standard audio driver comprises communicating audio data, via the communications network, with the peripheral by adjusting, based on the configuration data, at least one of a data rate of the audio data, a sample size of the audio data, a number of channels for the audio data, or a format of the audio data, (vii) the host computer is one of a plurality of virtual machines running on a virtualized computer, and (viii) the communication network is an Internet Protocol (IP) network.

2. The method of claim 1 wherein (i) executing the emulation comprises maintaining state information related to the peripheral, and (ii) generating the response comprises using the state information prior to communicating the communication with the peripheral, wherein communicating the communication with the peripheral comprises establishing a network session between the host computer and the peripheral computer and synchronizing the state information with the peripheral.

3. The method of claim 1 wherein the emulation generates the response to the communication in an absence of a data exchange with the peripheral.

4. The method of claim 1 wherein generating the response comprises constructing data sequences mimicking successful audio codec responses to a stream of data and discarding the stream of data.

5. The method of claim 1 wherein executing the emulation comprises:

capturing the communication; and responding, within the host computer, to the communication with the configuration data to be used by the device driver.

6. The method of claim 5 wherein responding to the communication precedes obtaining peripheral configuration data from the peripheral.

7. The method of claim 5, wherein responding to the communication occurs when the remote computer is disconnected from the host computer, and wherein the configuration data comprises default information.

8. The method of claim 1 wherein executing the device driver comprises loading the device driver and executing the emulation comprises emulating an attachment of the peripheral, and wherein loading the device driver and emulating the attachment occur prior to establishing a network session between the host computer and the remote computer.

9. The method of claim 1 further comprising receiving information from a source external to the host and the remote computers, wherein the information pertains to a peripheral type to emulate, and wherein the emulation of the peripheral comprises an emulation of a device of the peripheral type.

10. Apparatus for bridging, via a communications network connection, communications between a peripheral of a remote computer and a host computer, the apparatus comprising:
a peripheral emulator, within the host computer, enabled to execute an emulation of the peripheral to produce a response to a communication intended for the peripheral and produced by executing a device driver on the host computer, wherein the peripheral emulator provides the response to the device driver within a time limit less than a response latency between the host computer and the remote computer, wherein (i) the peripheral is an audio codec, (ii) the device driver is an industry standard audio driver included with an industry standard operating system, (iii) executing the emulation comprises presenting, via an audio bus driver, an audio controller interface to the industry standard audio driver, (iv) the emulation is an audio codec emulation, (v) executing the emulation further comprises producing configuration data for the industry standard audio driver, the configuration data based on an available bandwidth of a communications network between the host computer and the remote computer, (vi) executing the industry standard audio driver comprises communicating audio data, via the communications network, with the peripheral by adjusting, based on the configuration data, at least one of a data rate of the audio data, a sample size of the audio data, a number of channels for the audio data, or a format of the audio data, (vii) the host computer is one of a plurality of virtual machines running on a virtualized computer, and (viii) the communication network is an Internet Protocol (IP) network.

11. The apparatus of claim 10 further comprising a peripheral bus controller emulator, coupled to the peripheral emulator, enabled to (i) present an interface to a peripheral bus controller driver, and (ii) provide a data transfer, associated with the communication, via the peripheral bus controller driver, between the device driver and the peripheral emulator.

12. The apparatus of claim 11 wherein the peripheral bus controller emulator is further enabled to communicate data transfers, between the device driver and the peripheral, not requiring an emulated response by the peripheral emulator.

13. The apparatus of claim 10 wherein the peripheral emulator is further enabled to respond to the device driver as a local connection of the peripheral device in an absence of the communications network connection.

14. The apparatus of claim 10 wherein the communication is at least part of an initialization operation for the peripheral and wherein the communications network connection is an Internet Protocol (IP) session.

15. The apparatus of claim 10 wherein the peripheral emulator is enabled to capture the communication and respond to the communication with the configuration data that is communicated to the device driver.

16. The apparatus of claim 15 wherein the peripheral emulator is enabled to communicate the configuration data to the device driver before related peripheral configuration information is received from the peripheral.

17. A bridged computer system comprising:
a host computer, executing a device driver for a peripheral, comprising a peripheral emulator for emulating, at the host computer, the peripheral, wherein executing the device driver produces a communication for the peripheral that requires a response within a time limit, wherein the time limit is less than a response latency between the host computer and a remote client computer via a communications network; and
the remote client computer, coupled to the host computer via the communications network and comprising the peripheral, wherein (i) the communication, initiated by the device driver and intended for the peripheral, is captured by the peripheral emulator, (ii) the peripheral emulator produces configuration data, for the device driver, responsive to the communication, and (iii) the configuration data is produced in an absence of an exchange, via the communications network, between the remote client computer and the host computer; wherein the peripheral emulator executes an emulation of the peripheral to generate the response such that the response is received by the device driver within the time limit, wherein (a) the peripheral is an audio codec, (b) the device driver is an industry standard audio driver included with an industry standard operating system, (c) executing the emulation comprises presenting, via an audio bus driver, an audio controller interface to the industry standard audio driver, (d) the emulation is an audio codec emulation, (e) executing the emulation comprises producing the configuration data for the industry standard audio driver, the configuration data based on an available bandwidth of the communications network, (f) executing the industry standard audio driver comprises communicating audio data, via the communications network, with the peripheral by adjusting, based on the configuration data, at least one of a data rate of the audio data, a sample size of the audio data, a number of channels for the audio data, or a format of the audio data, (g) the host computer is one of a plurality of virtual machines running on a virtualized computer, and (h) the communication network is an Internet Protocol (IP) network.

* * * * *